United States Patent [19]

Kojima et al.

[11] 4,344,565

[45] Aug. 17, 1982

[54] CONTROL METHOD AND APPARATUS FOR AIR CONDITIONERS

[75] Inventors: Yasuhumi Kojima, Gifu; Atsunori Saito; Akiro Yoshimi, both of Kariya, all of Japan

[73] Assignee: Nippondenso Co., Ltd., Kariya, Japan

[21] Appl. No.: 171,407

[22] Filed: Jul. 23, 1980

[30] Foreign Application Priority Data

Aug. 1, 1979 [JP] Japan .................. 54-98529

[51] Int. Cl.³ ............................. G05D 23/00
[52] U.S. Cl. .................. 236/46 R; 165/12; 236/91 C
[58] Field of Search .................. 62/157, 231; 165/12; 236/46 R, 46 A, 46 F, 91 R, 91 C

[56] References Cited

U.S. PATENT DOCUMENTS 4,172,555 10/1979 Levine ............................ 236/46 R
4,274,475 6/1981 Rall et al. ........................ 165/12

Primary Examiner—Albert J. Makay
Assistant Examiner—Harry B. Tanner
Attorney, Agent, or Firm—Cushman, Darby & Cushman

[57] ABSTRACT

In control of an air conditioner, the rate of change of the actual temperature of air in a compartment is detected to detect a deviation between the actual temperature of air and a desired temperature of air. When the detected deviation is larger than a predetermined value, another deviation is also detected to adjust the temperature of air flow supplied from the air conditioner and to eliminate undesired temperature deviation caused by fluctuation of the heat load in the compartment.

7 Claims, 4 Drawing Figures

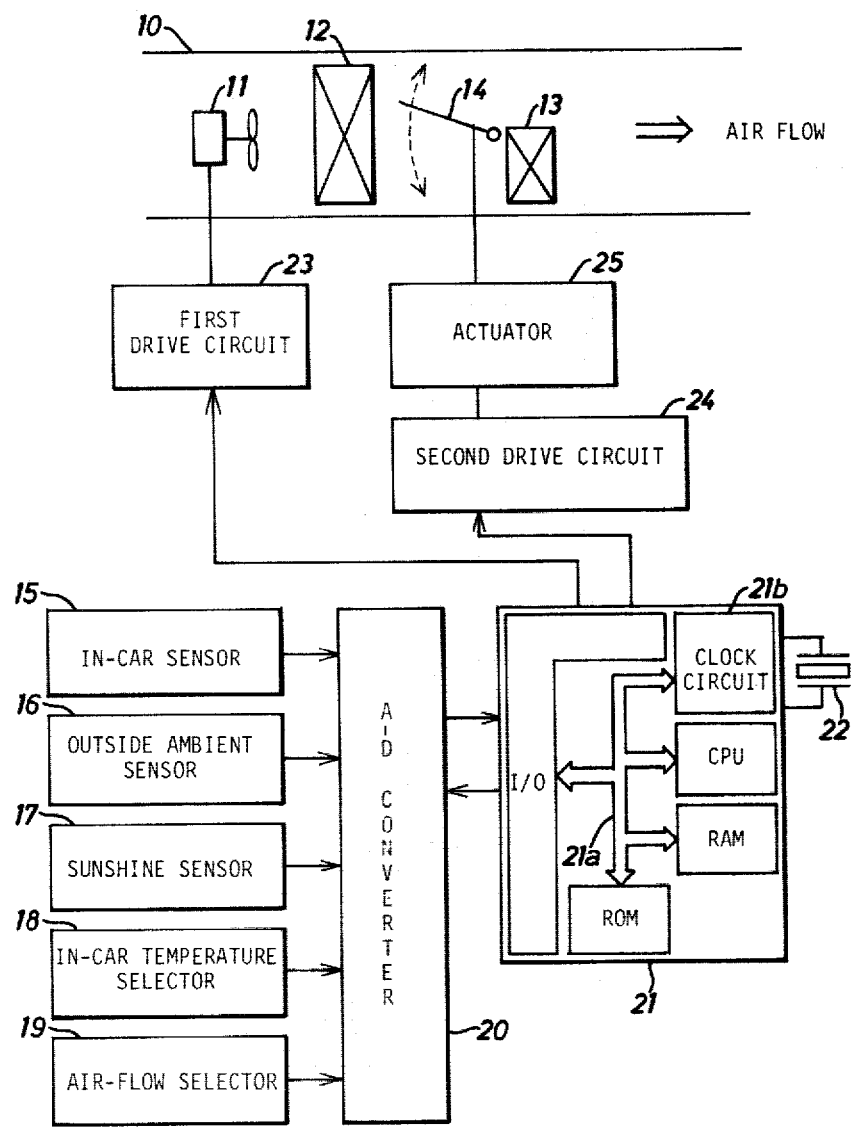

4,344,565

CONTROL METHOD AND APPARATUS FOR AIR CONDITIONERS

BACKGROUND OF THE INVENTION

The present invention relates to a control method and apparatus for air conditioners, and more particularly, but not exclusively, to a control method and apparatus suitable for an automobile air conditioner wherein the temperature of air flow is automatically controlled in accordance with change of the heat load in the passenger compartment of an automobile.

As shown in FIG. 1, a conventional control system for an air conditioner comprises a temperature selector 1 for producing an output signal indicative of a desired temperature $T_{set}$ of air in a compartment or region to be conditioned, an in-car sensor 2 for producing an output signal indicative of the actual temperature $T_r$ of air in the compartment, and a detector 3 responsive to the output signals from temperature selector 1 and sensor 2 for detecting any deviation between the desired temperature $T_{set}$ and the actual temperature $T_r$ and for producing an output signal indicative of the detected deviation. A temperature controller 4 receives the output signal from detector 3 to control the temperature of air flow in accordance with the deviation so as to adjust the actual temperature $T_r$ to the desired temperature $T_{set}$ and maintain it at the same.

During operation of temperature controller 4, the sensor 2 acts to produce a feedback signal indicative of any change of the actual temperature in the compartment, and the controller 4 acts to adjust the actual temperature $T_r$ to the desired temperature $T_{set}$ in response to the feedback signal from sensor 2. In this instance, the heat load in the compartment fluctuates in accordance with variations of the outside ambient temperature $T_{am}$, and subsequently the actual temperature $T_r$ fluctuates due to delay of heat transfer in the compartment. To restrain fluctuation of the actual temperature in the compartment, an outside ambient sensor 6 and an adder 7 are provided to preliminarily compensate the fluctuation of heat load caused by a change of the outside ambient temperature $T_{am}$.

In the control system described above, assuming that the quantity of air flow is at a constant value, the temperature of air flow is adjusted by controller 4 as represented by the following equation.

$$T_{ao} = K_{set} T_{set} - K_{am} \cdot T_{am} - K_r T_r + C$$

where $T_{set}$ is the desired temperature in the compartment, $T_{am}$ is the outside ambient temperature, $T_r$ is the actual temperature in the compartment, C is a constant, and $K_{set}$, $K_{am}$ and $K_r$ are respectively gains of selector 1 and sensors 6 and 2, which are preliminarily determined to adjust the actual temperature $T_r$ toward the desired temperature $T_{set}$ without any influence caused by changes of the outside ambient temperature. In controlling the air conditioner, although the outside ambient temperature is measured to compensate the temperature of air flow in accordance with fluctuation of the heat load in the compartment, it is disregarded to compensate the temperature of air flow in relation to another fluctuation of the heat load caused by the intensity and direction of sunshine entering the compartment, change of the vehicle speed and the number of passengers and the like, since the constant C is experimentarily determined in a fixed value. This results in any deviation between the actual temperature and the desired temperature due to the disregarded fluctuation of the heat load.

SUMMARY OF THE INVENTION

It is, therefore, a primary object of the present invention to provide an improved method and apparatus of controlling an air conditioner wherein when the actual temperature of air may not be adjusted to a desired value due to fluctuation of the heat load in a compartment caused by various disturbances, the temperature of air flow is compensated to eliminate undesired temperature deviation caused by fluctuation of the heat load.

According to a first aspect of the present invention, there is provided an air conditioner control apparatus for use with an air conditioner which is arranged to supply an air flow into a compartment or other region, such air conditioner comprising air flow quantity control means and air flow temperature control means, the air conditioner control apparatus being operable to control the quantity of heat, supplied by the air conditioner, to be a quantity necessary for adjusting the actual temperature of air in the compartment or other region to a desired value and to maintain it at the desired value, the air conditioner control apparatus being operable to control the air flow temperature control means in such manner that the air flow temperature will be such as to enable the air flow having a desired air flow quantity to supply the necessary heat quantity, the necessary heat quantity and the air flow temperature being determined employing electric signals in the form of a first electric signal indicative of the actual air temperature in the compartment or other region, and a second electric signal indicative of a desired air temperature in the compartment or other region.

The air conditioner control apparatus is operable to detect a first deviation between values of the preceding and following first electric signals at a predetermined time interval and to detect a second deviation between values of the first and second electric signals when the first deviation is smaller than a predetermined value, and is further operable to detect a third deviation related to the second deviation when the second deviation is larger than a predetermined value and to compensate the necessary heat quantity in accordance with the third deviation.

According to a second aspect of the present invention, there is provided a method of controlling an air conditioner which supplies an air flow into a compartment or other region, the air conditioner comprising air flow quantity control means and air flow temperature control means, the method comprising the steps of detecting the quantity of heat necessary for adjusting the actual temperature of air in the compartment or other region to a desired value and to maintain it at the desired value, and controlling the air flow temperature control means in such manner that the air flow temperature is such as to enable the air flow at a desired air flow quantity to supply the necessary heat quantity, the necessary heat quantity and the air flow temperature being determined employing electric signals in the form of a first electric signal indicative of the actual air temperature in the compartment or other region and a second electric signal indicative of a desired air temperature in the compartment or other region.

The method comprises the steps of:

detecting a first deviation between values of the preceding and following first electric signals at a predetermined time interval;

detecting a second deviation between values of the first and second electric signals when the first deviation is smaller than a predetermined value;

detecting a third deviation related to the second deviation when the second deviation is larger than a predetermined value; and compensating the necessary heat quantity in accordance with the third deviation.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 2 is a schematic block diagram of an electric control apparatus in accordance with the present invention adapted to an automobile air conditioner;

DESCRIPTION OF THE PREFERRED EMBODIMENT

Figure 1:
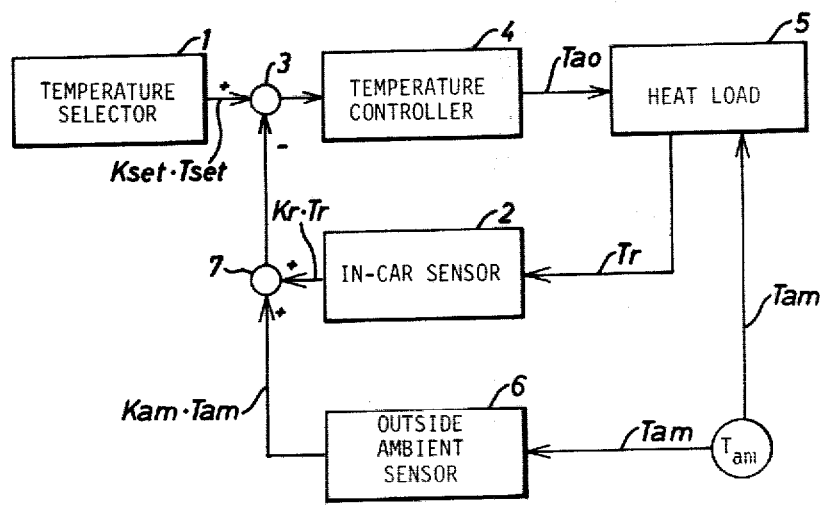
FIG. 1 is a functional block diagram of a conventional air conditioner control system.

Referring now to FIG. 2 of the drawings, there is schematically illustrated an electric control apparatus in accordance with the present invention which is adapted to an automobile air conditioner of a conventional type. The air conditioner comprises an air duct 10 which serves to allow the air flowing therethrough toward a passenger compartment of the automobile. The air duct 10 is provided therein with a blower 11, an evaporator 12 and a heater 13. The evaporator 12 is cooperable with a refrigerant compressor (not shown) to cool the air flowing therethrough from the blower 11 toward an air-blend door 14, as well known in conventional prior arts. The air-blend door 14 is arranged in a conventional manner to adjust the proportion of the cooled air flowing from evaporator 12 into the passenger compartment and the warmed air from the heater 13 flowing into the passenger compartment. The heater 13 is cooperable with a coolant system (not shown) of an automobile engine to partly warm the cooled air from evaporator 12.

The electric control apparatus comprises an analog-to-digital or A-D converter 20 connected to various sensors 15 to 17, an in-car temperature selector 18 and an air-flow selector 19. The in-car sensor 15 is provided on an instrument panel of the passenger compartment such that it detects the actual temperature $T_r$ of air in the passenger compartment to produce an analog signal with a level corresponding to the actual in-car temperature $T_r$. The outside ambient sensor 16 is located adjacent a grill for a radiator of the automobile to detect the actual ambient temperature $T_{am}$ outside the automobile, the sensor 16 producing and analog signal with a level corresponding to the actual ambient temperature $T_{am}$. The sunshine sensor 17 is located in the passenger compartment to detect the actual intensity $T_s$ of sunshine into the compartment from the exterior and to produce an analog signal with a level corresponding to the actual intensity $T_s$ of sunshine. The analog signals from sensors 15 to 17 are sequentially converted by the A-D converter 20 into binary signals respectively indicating the actual in-car temperature $T_r$, the actual ambient temperature $T_{am}$ and the actual intensity $T_s$ of sunshine.

The in-car temperature selector 18 is assembled on the instrument panel such that it is manipulated to select a desired in-car temperature $T_{set}$ so as to produce an analog signal with a level corresponding to the selected or desired in-car temperature $T_{set}$. The air-flow selector 19 is also assembled on the instrument panel and manually actuated to select a desired quantity W of air flow to be impelled by the blower 11 toward the evaporator 12, the selector 19 producing an analog signal with a level corresponding to the selected or desired quantity W of air flow. The analog signals from the selectors 18, 19 are sequentially converted by the A-D converter 20 into binary signals respectively indicating the selected in-car temperature $T_{set}$ and the selected quantity W of air flow.

The digital computer 21 is in the form of a single chip LSI microcomputer which receives a constant voltage from a voltage stabilizer (not shown) to be ready for its operation. The voltage stabilizer is supplied with electric power from an automobile battery (not shown) upon closure of an ignition switch (not shown) to produce the constant voltage. The microcomputer 21 comprises a central processing unit or CPU which is connected through a bus line 21a to an input-output device or I/O, a read only memory or ROM, and a random access memory or RAM. I/O receives the binary signals from A-D converter 20 upon request of CPU to store them in RAM temporarily. These stored binary signals are selectively read out from RAM and applied to CPU through bus line 21a. CPU is also connected through bus line 21a to a clock circuit 21b and serves to execute a predetermined program in accordance with clock signals from clock circuit 21b. The clock circuit 21b is cooperable with a crystal oscillator 22 to produce clock signals at a predetermined frequency (MHz). First and second timers $T_1$ and $T_2$ are respectively in the form of a counter which is provided within CPU of microcomputer 21. Each of the timers $T_1$, $T_2$ is cooperable with RAM to measure lapse of time from its starting operation by using clock signals from clock circuit 21b.

The above-noted predetermined program is previously stored in ROM to be executed in the microcomputer 21, as in the followings.

(1) Within two minutes immediately after start of the computer 21, an optimum temperature $T_{ao}$ of air flow corresponding to an optimum opening angle of air-blend door 14 is repetitively calculated by CPU from the following equations (1), (2) and (3) in accordance with the selected temperature $T_{set}$, the actual ambient and in-car temperatures $T_{am}$, $T_r$, the actual intensity $T_s$ of sunshine and a compensative deviation $\Delta T_{setN}$.

$$T_{aoo} = \qquad (1)$$
$$K_{set}(T_{set} + \Delta T_{setN}) - K_r \cdot T_r - K_s \cdot T_s - K_{am} \cdot T_{am} + C$$

$$Q = K_q \cdot W_o (T_{aoo} - T_r) \qquad (2)$$

$$T_{ao} = \frac{Q}{K_q \cdot W} + T_r \qquad (3)$$

where $T_{aoo}$ is a temperature of air flow, and $K_s$ is a gain of the sunshine sensor 17, and where $K_q$ is a constant determined by the physical property of air, and Q is an interim quantity of heat which corresponds to changes of heat load and is discharged into the compartment with an interim quantity $W_o$ of air flow. The compensative deviation $\Delta T_{setN}$ is set as zero in RAM immediately after start of the computer 21. Each of the gains $K_{set}$, $K_r$, $K_s$ and $K_{am}$ is previously stored in ROM, and the constants C, $K_q$ and interim quantity $W_o$ of air flow are also previously stored in ROM respectively. As understood from the above description, within the above-noted two minutes the quantity Q of heat is repetitively calculated by CPU to be discharged into the compartment with the interim quantity of $W_o$ of air flow, and the optimum temperature $T_{ao}$ of air flow is also repetitively calculated by CPU to discharge the calculated quantity Q of heat into the compartment with the selected quantity W of air flow. Additionally, the interim quantity $W_o$ of air flow is selected as a constant to assume each of the above-noted gains as a constant.

(2) After lapse of time of two minutes described above, CPU repetitively discriminates at a time interval of twenty seconds as to whether or not the compensative deviation $\Delta T_{setN}$ should be altered. This discrimination is conducted by CPU from the following equations (4), (5) and the following inequalities (6), (7).

$$DT = T_r - T_{ro} \quad (4)$$

$$\Delta T_{set} = T_{set} - T_r \quad (5)$$

where DT is a fluctuation of the actual in-car temperature $T_r$, and $T_{ro}$ is an in-car temperature which the in-car sensor 15 detected twenty seconds before detection of the actual in-car temperature $T_r$, and where $\Delta T_{set}$ is the actual deviation between the selected temperature $T_{set}$ and the actual in-car temperature $T_r$.

$$|DT| \leq 0.3° C. \quad (6)$$

$$|\Delta T_{set}| \leq 0.5° C. \quad (7)$$

When $|DT| > 0.3°$ C. or $|\Delta T_{set}| \leq 0.5°$ C., CPU determines that alteration of the compensative deviation $\Delta T_{setN}$ is unnecessary. When $|DT| \leq 0.3°$ C. and $|\Delta T_{set}| > 0.5°$ C., CPU determines that alteration of the compensative deviation $\Delta T_{setN}$ is necessary. A new compensative deviation $\Delta T_{setN}$ is calculated by CPU from the following equation (8).

$$\Delta T_{setN} = \Delta T_{setN} + \Delta T_{set} \quad (8)$$

This equation (8) indicates that the new compensative deviation $\Delta T_{setN}$ is obtained as the sum of a previously obtained deviation $\Delta T_{setN}$ and the actual deviation $\Delta T_{set}$. After the new compensative deviation $\Delta T_{setN}$ was once calculated and stored in RAM, CPU acts to inhibit a further calculation of another compensative deviation $\Delta T_{setN}$ within two minutes and thereafter repetitively discriminates necessity of the same further calculation at the time interval of twenty seconds, as previously described. Until the above-noted further calculation is requested by CPU after the above calculation of the new compensative deviation $\Delta T_{setN}$, an optimum temperature $T_{ao}$ of air flow is repetitively calculated by CPU from the equations (1), (2), (3) in relation to the new compensative deviation $\Delta T_{setN}$ read out from RAM, as previously described.

(3) Upon completing each calculation of the optimum temperature $T_{ao}$ of air flow, CPU acts to repetitively produce a binary signal indicative of the calculated optimum temperature $T_{ao}$ of air flow and also to repetitively produce a binary signal indicative of the selected quantity W of air flow read out from RAM. In addition, the time interval of two minutes is defined by cooperation of the timers $T_1$, $T_2$, and the time interval of twenty seconds is also defined by the second timer $T_2$. In practice of the present invention, a microcomputer of INTEL 8048 type manufactured by INTEL CORP. has been used as the computer 21 due to its commercial availability. Detail description regarding the microcomputer is eliminated because the particular construction and programming process are well known in prior arts.

A first drive circuit 23 includes a digital-to-analog or D-A converter connected through a latch circuit to the microcomputer 21, and a transistor circuit as an amplifier connected to the D-A converter. The binary signal indicative of the selected quantity W of air flow from computer 21 is latched by the latch circuit and converted by the D-A converter into an analog signal with a level corresponding to the selected quantity W of air flow. The analog signal from the D-A converter is amplified by the transistor circuit as a drive signal for driving the blower 11. This means that the blower 11 is driven by the drive signal from drive circuit to impel the selected quantity W of air flow toward the evaporator 12.

A second drive circuit 24 includes a door position sensor for detecting the actual opening angle of air-blend door 14 to produce an analog signal with a level corresponding to the actual door opening angle. The second drive circuit 24 also includes a digital-to-analog or D-A converter connected through a latch circuit to the microcomputer 21, and a comparator circuit connected to the D-A converter. The binary signal indicatives of the calculated optimum temperature $T_{ao}$ of air flow is latched by the latch circuit and converted by the D-A converter into an analog signal with a level corresponding to the calculated temperature $T_{ao}$ of air flow. When the level of analog signal from the D-A converter is higher than that of analog signal from the door position sensor, the comparator circuit acts to produce a first drive signal. When the level of analog signal from the D-A converter is lower than that of analog signal from the door position sensor, the comparator circuit acts to produce a second drive signal. Each of the first and second drive signals disappears from the comparator circuit when the level of analog signal from the D-A converter is equal to that of analog signal from the door position sensor. In other words, the second drive circuit 24 receives each binary signal indicative of a calculated temperature $T_{ao}$ of air flow from computer 21 to repetitively produce one of first and second drive signals only while the level of one of the first and second drive signals deviates from the level of each analog signal which is issued from the door position sensor in relation to changes of the actual door opening angle.

An electrically operated vacuum actuator 25 includes a servomotor associated with the air-blend door 14. The servomotor is provided therein with a servo-chamber which is connected through a first solenoid valve to an engine intake manifold of the automobile. The servo-chamber of the servomotor is also connected through a second solenoid valve to the exterior. When the first solenoid valve is opened in response to the first drive signal from drive circuit 24, negative pressure from the engine intake manifold is applied to the servo-chamber of the servomotor to increase the actual opening angle of air-blend door 14 toward an optimum value. When the second solenoid valve is opened in response to the second drive signal from drive circuit 24, the atmospheric pressure from the exterior is applied to the servo-chamber to decrease the actual door opening angle toward the optimum value. When each of the solenoid valves is closed upon disappearance of each drive signal from drive circuit 25, the servomotor is isolated from the exterior and engine intake manifold to maintain the door opening angle in the optimum value.

Figure 3:
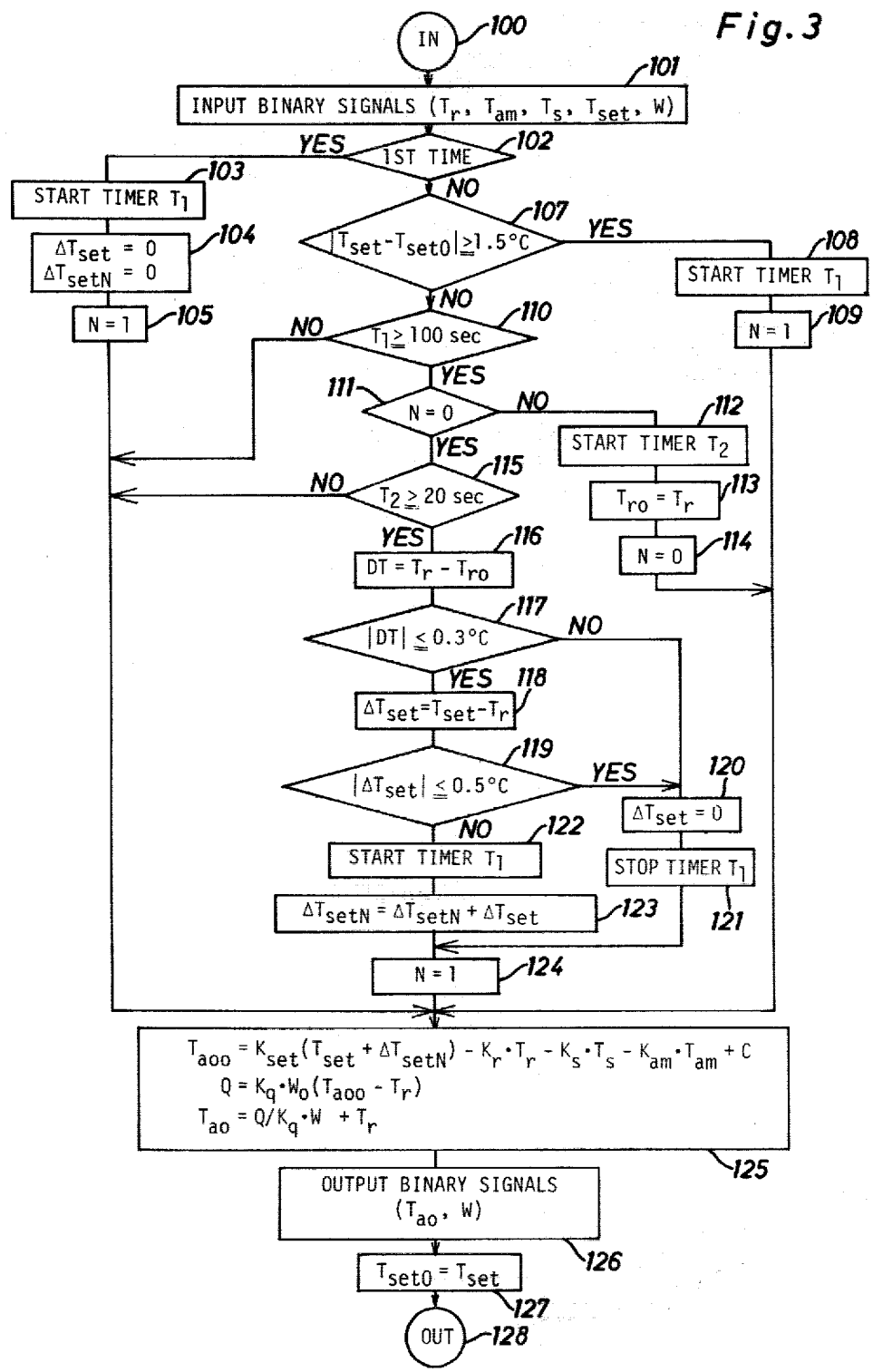
FIG. 3 is a flow diagram illustrating operation of the digital computer shown in block form in FIG. 2.

Hereinafter, operational modes of the electric control apparatus will be described in detail with reference to a flow diagram shown in FIG. 3. When the electric control apparatus is conditioned in its operation due to start of the automobile, the microcomputer 21 is supplied with the constant voltage from the voltage stabilizer to initiate execution of the predetermined program according to the flow diagram of FIG. 3.

When the actual temperature $T_r$ of air within the passenger compartment is detected by the in-car sensor 15, it is produced from the sensor 15 as an analog signal and applied to the A-D converter 20. The actual ambient temperature $T_{am}$ outside the automobile is detected by the ambient sensor 16 as an analog signal, and the actual intensity $T_s$ of sunshine is also detected by the sunshine sensor 17 as an analog signal, these analog signals from sensors 16, 17 being respectively applied to the A-D converter 20. Assuming that a desired in-car temperature $T_{set}$ is selected by the temperature selector 18, an analog signal is produced from the selector 18 and applied to the A-D converter 20. Assuming that a desired quantity W of air flow is also selected by the air-flow selector 19, an analog signal is produced from the selector 19 and applied to the A-D converter 20.

When the computer program proceeds to a point 101 through a point 100, the analog signals from the sensors 15 to 17 and selectors 18, 19 are respectively converted by the A-D converter 20 into binary signals, each of which is temporarily stored in RAM, as previously described. Then, CPU proceeds the program to a point 103 through a point 102 and makes the first timer $T_1$ start for counting clock signals from clock circuit 21b at a time of zero (sec). This results in protection of the microcomputer 21 from various disturbances appearing immediately after start of the first timer $T_1$. Thereafter, each of the actual and compensative deviations $\Delta T_{set}$ and $\Delta T_{setN}$ is initially set as zero at a point 104, and a flag N is also set as one at a point 105.

When the computer program proceeds to the following point 125 from point 105, the gains and constant $K_{set}$, $K_r$, $K_s$, $K_{am}$ and C are respectively read out from ROM, and the desired and actual temperatures $T_{set}$, $T_r$ and $T_{am}$ are respectively read out from RAM together with the actual intensity $T_s$ of sunshine. Then, a temperature $T_{aoo}$ of air flow is calculated by CPU from the equation (1) in accordance with the above-noted read out values, taking account of the initial compensative deviation $\Delta T_{setN}$ of zero. An interim quantity Q of heat is also calculated by CPU from the equation (2) in accordance with the calculated and actual temperature $T_{aoo}$ and $T_r$, and the constants $K_q$, $W_o$ read out from ROM. Thereafter, an optimum temperature $T_{ao}$ of air flow is calculated by CPU from the equation (3) in accordance with the calculated quantity Q of heat, the constant and actual temperature $K_q$ and $T_r$, and the selected quantity W of air flow read out from RAM.

When the computer program proceeds to a point 126, a binary signal indicative of the calculated optimum temperature $T_{ao}$ of air flow is produced from CPU and applied through I/O to the second drive circuit 24. Simultaneously, a binary signal indicative of the selected quantity W of air flow is produced from CPU and applied to the first drive circuit 23. Then, the first drive circuit 23 produces a drive signal in response to the binary signal indicative of the selected quantity W of air flow such that the blower 11 is driven to impel the selected quantity W of air flow toward the evaporator 12. The second drive circuit 24 is responsive to the binary signal indicative of the calculated temperature $T_{ao}$ of air flow to produce one of first and second drive signals in relation to an analog signal from the door position sensor so that the actuator 25 is controlled to adjust the actual opening angle of air-blend door 14 toward an optimum value. As a result, the cooled air from evaporator 12 is partly warmed by the heater 13 under the adjustment of blend door 14 and discharged into the compartment to control the actual in-car temperature toward the selected value. Thereafter, the selected temperature $T_{set}$ from RAM is set as a newly selected temperature $T_{set0}$ at a point 127, and the computer program proceeds through a point 128 to various routines such as a control routine for the refrigerant compressor and the like.

When the computer program proceeds again to the point 102, CPU determines as "No" because of completion of the initial settings at points 104, 105, the program proceeding to a point 107. Then, CPU discriminates as to alteration of the previously-set in-car temperature $T_{set0}$ in relation to a selected temperature $T_{set}$ read out newly from RAM. If an absolute value of a difference $(T_{set}-T_{set0})$ is equal to or larger than 1.5° C., CPU determines as "yes" and proceeds the computer program to a point 108. Then, the first timer $T_1$, which has already started at point 103, is reset and restarts to count clock signals from the clock circuit 21b at the time of zero (sec). This results in protection of the microcomputer 21 from various disturbances appearing immediately after restarting of the first timer $T_1$.

When the flag N is newly set as one at a point 109, the program proceeds to point 125, and an optimum temperature $T_{ao}$ of air flow is calculated by CPU in relation to the initial compensative deviation $\Delta T_{setN}=0$, as previously described. Then, CPU proceeds the program to point 126 to produce binary signals respectively indicative of the calculated temperature $T_{ao}$ of air flow and the selected quantity W of air flow. Thus, the first drive circuit 23 drives the blower 11 to impel the selected quantity W of air flow toward the evaporator 12, and the actuator 25 cooperates with the second drive circuit 24 to control the actual door opening angle so that the actual in-car temperature in the compartment is adjusted toward the selected value, as previously described. If CPU determines as "no" at the above point 107 because of no alteration of the selected temperature $T_{set}$, the computer program proceeds to a point 110, and CPU discriminates whether or not one hundred seconds have passed after start of the first timer $T_1$. If one hundred seconds have not yet passed after start of the first timer $T_1$, CPU determines as "no" and proceeds the computer program to points 125, 126 to control the actual in-car temperature toward the selected value, as previously described.

If at the above point 110, one hundred seconds have already passed after start of the first timer $T_1$, CPU determines as "yes" to discriminate at a point 111 as to whether or not the flag N is zero. When CPU determines as "no", as understood from the above description, it proceeds the program to a point 112 such that the second timer $T_2$ starts to count clock signals from clock circuit 21b at the time of zero (sec). When the computer program proceeds to a point 113, a reference in-car temperature $T_{ro}$ is stored in RAM as the actual in-car temperature $T_r$ read out from RAM and, in turn, the flag N is set as zero at a point 114. Then, the computer program proceeds to points 125 and 126, as previously described.

When the computer program proceeds again to point 111, CPU determines as "yes" in relation to the flag N which was previously set as zero at point 114. Then, CPU proceeds the program to a point 115 to discriminate whether or not twenty seconds have passed after start of second timer $T_2$. If twenty seconds do not yet pass after start of second timer $T_2$, CPU determines as "no" to proceed the computer program to points 125, 126, as previously described. If at the above point 115, twenty seconds have already passed after start of second timer $T_2$, CPU determines as "yes" to proceed the computer program to the following point 116. This means that the point 115 acts a role for determining the timing to enter the program defined by points 116 to 124.

When the computer program proceeds to point 116, as previously described, CPU calculates a fluctuation DT of in-car temperature from the equation (4) by using the actual and reference in-car temperatures $T_r$ and $T_{ro}$ from RAM. Then, CPU proceeds the computer program to point 117 to discriminate whether or not an absolute value of the calculated fluctuation DT is equal to or smaller than 0.3° C. This means that CPU discriminates as to whether or not the actual temperature in the passenger compartment is stabilized. If the absolute value $|DT|$ is equal to or smaller than 0.3° C., CPU determines as "yes" because of stability of the actual in-car temperature to proceed the computer program to point 118. Then, CPU calculates the actual deviation $\Delta T_{set}$ from the equation (5) by using the selected and actual in-car temperatures $T_{set}$ and $T_r$ from RAM. When the computer program proceeds to point 119, CPU discriminates whether or not an absolute value of the calculated deviation $\Delta T_{set}$ is equal to or smaller than 0.5° C. This means that under stability of the actual in-car temperature, CPU discriminates whether or not the actual in-car temperature $T_r$ deviates from the selected temperature $T_{set}$.

If the absolute value $|\Delta T_{set}|$ is larger than 0.5° C., CPU discriminates as "no" to proceed the program to point 122. Then, the first timer $T_1$ is reset and restarts at the time of zero (sec), as previously described, the computer program proceeding to point 123. Subsequently, a compensative deviation $\Delta T_{setN}$ is calculated by CPU from the equation (8) in accordance with the calculated deviation $\Delta T_{set}$ and the initial deviation $\Delta T_{setN}$ of zero and is stored in RAM. Thereafter, the flag N is set as one at point 124. When the program proceeds to point 125, CPU calculates a temperature $T_{aoo}$ of air flow from the equation (1) in relation to the calculated compensative deviation $\Delta T_{setN}$, as previously described. Subsequently, an optimum temperature $T_{ao}$ of air flow is calculated by CPU from the equations (2), (3) in relation to the calculated temperature $T_{aoo}$ of air flow, as previously described.

When the computer program proceeds to point 126, CPU produces binary signals respectively indicative of the calculated temperature $T_{ao}$ of air flow and the selected quantity W of air flow. Thus, the blower 11 is driven by the first drive circuit 23 in response to the binary signal indicative of the selected quantity W of air flow to impel the selected quantity W of air flow toward the evaporator 12. The actuator 25 also cooperates with the second drive circuit 24 in response to the binary signal indicative of the calculated temperature $T_{ao}$ of air flow to control the door opening angle so that the actual in-car temperature is adjusted toward the selected value. This means that adjustment of the actual in-car temperature toward the selected value is conducted on a basis of the calculated temperature $T_{ao}$ of air flow taking account of the calculated compensative deviation $\Delta T_{setN}$.

If CPU determines as "no" at point 117 or determines as "yes" at point 119, it proceeds the program to point 120 to set the calculated deviation $\Delta T_{set}$ as zero. Then, CPU acts to halt counting operation of the first timer $T_1$ at point 121 and also sets the flag N as one at point 124. Thereafter, the computer program is proceeded by CPU to points 125, 126, as previously described. When the computer program proceeds again to point 111, CPU discriminates as "no" because the flag N is set as one, and proceeds the program to point 112 to restart the second timer $T_2$ at the time of zero (sec). When the computer program proceeds to point 116 after the flag N was set as zero at point 114, CPU again calculates a fluctuation DT to perform execution at points 117 to 126, as previously described.

In other words, after lapse of two minutes defined by timers $T_1$, $T_2$, a fluctuation DT of the actual in-car temperature is repetitively calculated at point 116 with each time interval of twenty seconds to perform discrimination at point 117. When the discrimination at point 117 is performed as "yes," a compensative deviation $\Delta T_{setN}$ is obtained at point 123 in relation to the actual deviation $\Delta T_{set}$ at point 118 to calculate an optimum temperature $T_{ao}$ of air flow and to disable execution at points 116 to 123 during the following time interval of two minutes, as previously described.

Figure 4:
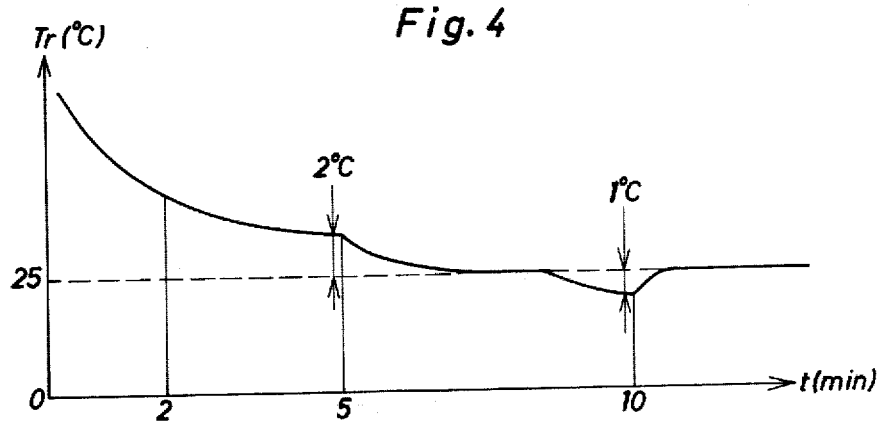
FIG. 4 is a graph illustrating a variation of the actual in-car temperature in relation to lapse of time.

In FIG. 4, there is illustrated the actual in-car temperature $T_r$ in relation to lapse of time t during operation of the above control apparatus. Assuming that CPU initiates execution of the computer program with the selected in-car temperature $T_{set}$ of 25° C. in summer, control of the actual in-car temperature in the compartment is continued without calculation of a compensative deviation $\Delta T_{setN}$ during two minutes after initiation of CPU, as shown at points 100 to 115 of FIG. 3.

Upon lapse of time of the above-noted two minutes, a fluctuation DT of the actual in-car temperature is obtained at point 116, as previously described. Then, CPU determines as "no" because the actual in-car temperature still fluctuates, as understood from FIG. 4, and acts to halt counting operation of timer $T_1$ so as to repetitively perform descrimination at point 117 at each time interval of twenty seconds. When the descrimination at point 117 is performed as "yes" at the actual in-car temperature of 27° C. upon lapse of five minutes, as understood from FIG. 4, the actual deviation $\Delta T_{set}$ is obtained as $-2°$ C. at point 118, and a compensative deviation $\Delta T_{setN}$ is also obtained as $-2°$ C. to perform calculation at point 125, as previously described. Thus, the actual in-car temperature is adjusted by the control apparatus from 27° C. toward 25° C.

When the actual stabilized in-car temperature becomes 24° C. due to change of disturbances such as the number of passengers, the actual speed of the automobile and the like, the actual deviation $\Delta T_{set}$ is obtained as 1° C. at point 118, and a compensative deviation $\Delta T_{setN}$ is also obtained as $-1°$ C. at point 123 to perform calculation at point 125, as previously described. Thus, the actual in-car temperature is further adjusted by the control apparatus from 24° C. toward 25° C. As a result, the actual in-car temperature is smoothly adjusted by the control apparatus into a predetermined range between ($T_{set}+0.5°$ C.) and ($T_{set}-0.5°$ C.). Additionally, each time interval defined by timers $T_1$, $T_2$ may be changed in accordance with capability of the automobile air conditioner.

In the actual practices of the present invention, the above control apparatus for the automobile air conditioner may be modified to eliminate both of the ambient and sunshine sensors 16, 17. Thus, the modified control apparatus becomes simple in construction and low in production cost. The modified control apparatus also ensures substantially the same precise control as that of the above embodiment. In this modification, the actual in-car temperature may be adjusted in combination of each control of the air blend door 14 and blower 11.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A method of controlling an air conditioner which supplies an air flow into a compartment or other region, the air conditioner comprising air flow quantity control means and air flow temperature control means, the method comprising the steps of detecting the quantity of heat necessary for adjusting the actual temperature of air in said compartment or other region to a desired value and to maintain it at said desired value, and controlling said air flow temperature control means in such manner that the air flow temperature is such as to enable the air flow at a desired air flow quantity to supply said necessary heat quantity, said necessary heat quantity and said air flow temperature being determined employing electric signals in the form of a first electric signal indicative of the actual air temperature in said compartment or other region and a second electric signal indicative of a desired air temperature in said compartment or other region, wherein the improvement comprises the steps of:

detecting a first deviation between values of the preceding and following first electric signals at a predetermined time interval;

detecting a second deviation between values of the first and second electric signals when said first deviation is smaller than a predetermined value;

determining a third deviation related to said second deviation when said second deviation is larger than a predetermined value; and compensating said necessary heat quantity in accordance with said third deviation.

2. A method of controlling an air conditioner as claimed in claim 1, and comprising the step of halting the detection of said first, second and third deviations during a predetermined period of time after compensation of said necessary heat quantity.

3. A method of controlling an air conditioner as claimed in claim 1 or 2, wherein said first deviation is detected in response to the preceding and following first electric signals at a time interval of twenty seconds.

4. A method of controlling an air conditioner as claimed in claim 1 or 2, wherein said second deviation is detected in response to the first and second electric signals when said first deviation is smaller than 0.3° C.

5. A method of controlling an air conditioner as claimed in claim 1 or 2, wherein said third deviation is determined in relation to said second deviation when said second deviation is larger than 0.5° C.

6. In an air conditioner control apparatus for use with an air conditioner which is arranged to supply an air flow into a compartment or other region, such air conditioner comprising air flow quantity control means and air flow temperature control means, the air conditioner control apparatus having means for controlling the quantity of heat, supplied by the air conditioner, to be a quantity necessary for adjusting the actual temperature of air in said compartment or other region to a desired value and to maintain it at said desired value, the air conditioner control apparatus having means for controlling said air flow temperature control means in such manner that the air flow temperature will be such as to enable the air flow having a desired air flow quantity to supply said necessary heat quantity, said necessary heat quantity and said air flow temperature being determined employing electric signals in the form of a first electric signal indicative of the actual air temperature in said compartment or other region, and a second electric signal indicative of a desired air temperature in said compartment or other region, the improvement wherein the air conditioner control apparatus includes means for detecting a first deviation between values of the preceding and following first electric signals at a predetermined time interval and for detecting a second deviation between values of the first and second electric signals when said first deviation is smaller than a predetermined value, and for determining a third deviation related to said second deviation when said second deviation is larger than a predetermined value and to compensate said necessary heat quantity in accordance with said third deviation.

7. An air conditioner control apparatus as claimed in claim 6, and comprising a digital computer to control as aforesaid said air flow temperature control means in dependence upon said determined values which are calculated by the computer in accordance with its programming.

* * * * *